United States Patent [19]
Sugita

[11] Patent Number: 5,638,364
[45] Date of Patent: Jun. 10, 1997

[54] ATM-LAN WITH CLSF PROCESSOR AND SIMPLIFIED CLAD UNITS

[75] Inventor: Masahiro Sugita, Tokyo, Japan

[73] Assignee: NEC Corporation, Japan

[21] Appl. No.: 518,263

[22] Filed: Aug. 23, 1995

[30] Foreign Application Priority Data

Aug. 23, 1994 [JP] Japan .................................. 6-198541

[51] Int. Cl.$^6$ .............................. H04J 3/08; H04Q 11/04
[52] U.S. Cl. ......................... 370/397; 370/401; 370/474
[58] Field of Search ........................... 370/85.13, 85.14, 370/60.1, 79, 60, 94.1, 17, 54, 68.1

[56] References Cited

U.S. PATENT DOCUMENTS

| | | | |
|---|---|---|---|
| 5,280,476 | 1/1994 | Kojima et al. | 370/60.1 |
| 5,450,399 | 9/1995 | Sugita | 370/60.1 |
| 5,517,497 | 5/1996 | Le Boudec et al. | 370/60.1 |
| 5,548,589 | 8/1996 | Jeon et al. | 370/60.1 |

FOREIGN PATENT DOCUMENTS

| | | | |
|---|---|---|---|
| 0473066A1 | 3/1992 | European Pat. Off. | H04L 12/46 |
| 5-227155 | 9/1993 | Japan | H04L 12/14 |

*Primary Examiner*—Douglas W. Olms
*Assistant Examiner*—Matthew C. Phillips
*Attorney, Agent, or Firm*—Ostrolenk, Faber, Gerb & Soffen, LLP

[57] ABSTRACT

In an ATM-LAN communication system, cell assembly disassembly (CLAD) units provide segmentation of a packet received from a LAN into payloads and assembling them into ATM cells, and disassembling received ATM cells into payloads and assembling them into a packet for transmission to the LAN. A connectionless switching function (CLSF) processor receives ATM cells either from an ATM switch and the CLAD units, and includes a database for storing address information of the received ATM cells and rotating the received ATM cells to the ATM switch and the CLAD units according to the address information of the database. The database has a destination address (DA) field, a VPI field and a VCI field. In response to an ATM cell, a source address, a VPI and a VCI contained in the cell are respectively stored into the DA, VPI and VCI fields of a database entry, and the database is searched for an entry having a DA field containing the source address of the received cell, a VPI field and a VCI field whose contents are different from the VPI and VCI of the received cell, and if such an entry is detected by the search, the VPI and VCI of the cell are rewritten with the different VPI and VCI to produce a transmit cell, and forwards the transmit cell to a destination. The database is further searched for an entry having a DA field containing the source address of the received cell. If the search fails to detect such an entry, the VPI and VCI of the cell are rewritten with broadcast VPI and VCI.

12 Claims, 4 Drawing Sheets

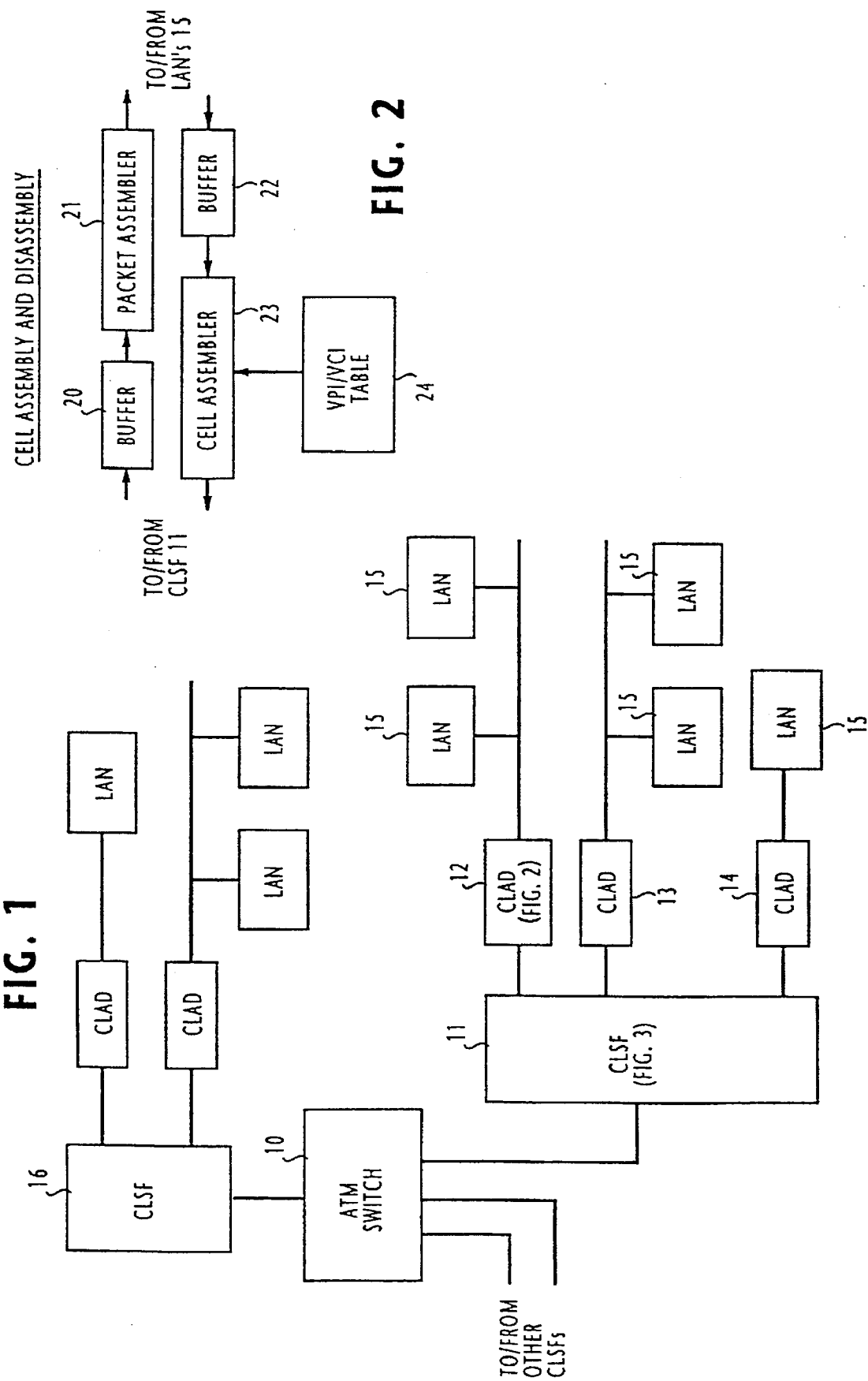

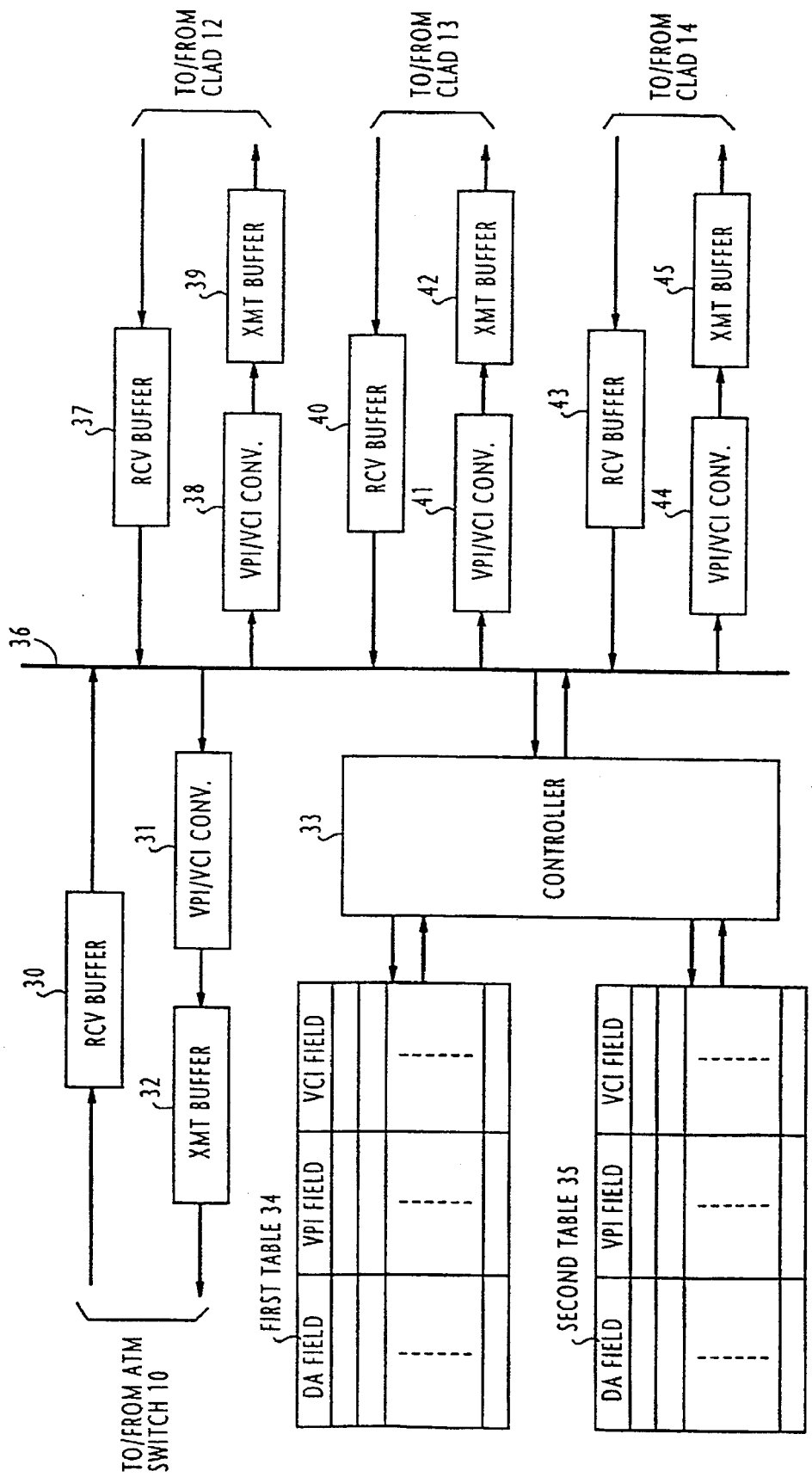

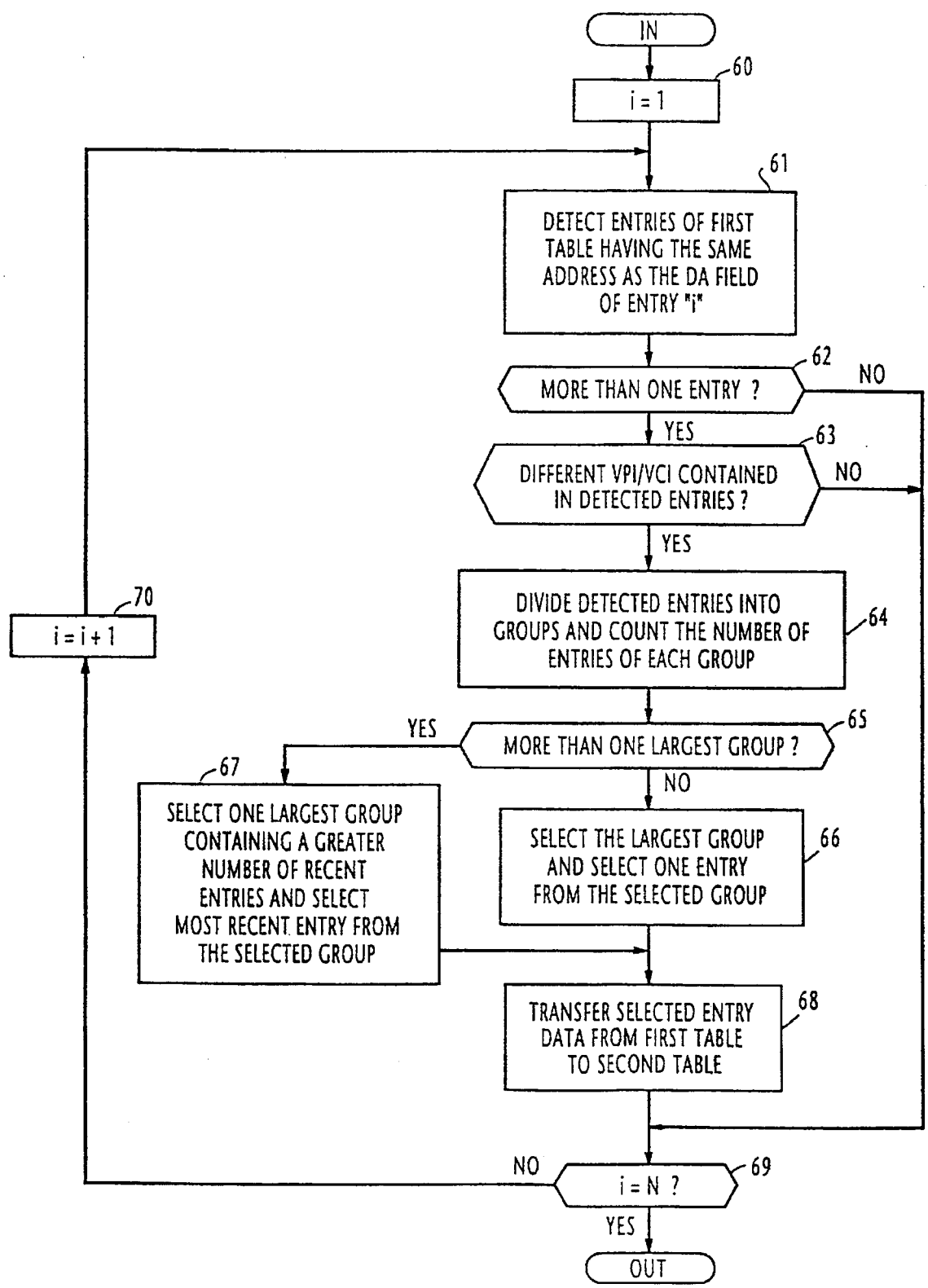

ATM-LAN WITH CLSF PROCESSOR AND SIMPLIFIED CLAD UNITS

BACKGROUND OF THE INVENTION

1. Field of the Invention

The present invention relates generally to an inter-LAN (local area network) communication system wherein a plurality of LANs are interconnected by an ATM switch, and more specifically to an address "learning" technique used at the interface between the ATM switch and the LANs.

2. Description of the Related Art

In a communication system in which local area networks such as Ethernet are interconnected by an ATM switch, the data handled by the LANs are in the form of variable bit rate (VBR) packets, while the data handled by the ATM switch are in the form of fixed length ATM cells whose payload contains source and destination addresses (SA, DA) and whose header contains a virtual path identifier (VPI) and a virtual channel identifier (VCI). A cell assembly disassembly unit is therefore provided at the interface between the ATM switch and each local area network to provide data format conversion between packets and ATM cells. ATM cells bearing the same address information are assembled into a packet, and an error check is performed on the packet using CRC (cyclic redundant check) bits before the packet is sent to a LAN. Prior art cell assembly disassembly (CLAD) units include an address table for storing the SA, VPI and VCI data of ATM-to-LAN cells whenever such a cell is received from the ATM switch. When a LAN-to-ATM packet is received, the CLAD unit searches the address table for an entry having the same destination address as that of the received packet. If such an entry is detected in the address table, the CLAD unit disassembles the packet into one or more payload segments depending on the packet length, and assembles ATM cells each with a header containing the VPI and VCI of the detected entry.

In addition, the address table is updated according to a "learning" process such that all entries of the table are first searched in response to receipt of an ATM cell to determine whether the same address data is already stored in any of the entries. If not, the cell address data is stored in a vacant entry. If the same address data is already stored in an entry, the registered data is replaced with the address data of the cell and the time-lapse indicator of the entry is reset to zero. The time-lapse indicator of each entry is incremented by a predetermined amount at periodic intervals. If the time-lapse indicator of an entry exceeds a predetermined threshold value, the address data of that entry is erased.

Since the CRC error check on the payload bits is performed after a packet is assembled, a provision is also made in the prior art CLAD unit to update the address table at the time when a CRC check reveals that there is no error in the payloads of the cells, so that corrupted source address data cannot be stored in the address table.

However, since the table is searched is performed each time an address-containing ATM cell is received and the time-lapse indicators of all stored table entries are incremented at periodic intervals, a heavy burden is placed on the cell assembly disassembly unit.

SUMMARY OF THE INVENTION

It is therefore an object of the present invention to provide implementation of simplified CLAD units by separating address registration and routing (switching) functions from the CLAD units in a connectionless switching function (CLSF) processor.

The present invention provides an apparatus for an ATM-LAN communication system. The apparatus comprises a plurality of cell assembly disassembly (CLAD) units for segmenting a packet received from a LAN into payloads and assembling the payloads into ATM cells each containing a VPI and a VCI, and disassembling received ATM cells into payloads and assembling the payloads into a packet for transmission to the LAN. A connectionless switching function (CLSF) processor is provided for receiving ATM cells either from the ATM switch and from the CLAD units. The processor includes a database for storing address information of the received ATM cells and routing the received ATM cells to the ATM switch and the CLAD units according to the address information of the database.

In a specific aspect, the database has a plurality of entries each having a destination address (DA) field, a VPI field and a VCI field. The CLSF processor is responsive to receipt of an ATM cell for respectively storing a source address, a VPI and a VCI contained in the received cell into the DA, VPI and VCI fields of one of the database entries. The processor makes a search through the database for an entry having a DA field containing the source address of the received cell a VPI field and a VCI field whose contents are different from the VPI and VCI of the received cell, and if such an entry is detected by the search, rewrites the VPI and VCI of the cell with the different VPI and VCI to produce a transmit cell, and forwards the transmit cell to a destination. Additionally, the CLSF processor is responsive to the received ATM cell for making a search through the database for an entry having a DA field containing the source address of the received cell. If the search fails to detect such an entry, the processor rewrites the VPI and VCI of the cell with broadcast VPI and VCI to produce a broadcast cell, and forwards the broadcast cell to a plurality of destinations.

BRIEF DESCRIPTION OF THE DRAWINGS

The present invention will be described in further detail with reference to the accompanying drawings, in which:

FIG. 1 is a block diagram of a LAN-ATM network of the present invention;

FIG. 2 is a block diagram of a simplified CLAD unit of the present invention;

FIG. 3 is a block diagram of a CLSF processor according to the present invention;

FIG. 5 is a flowchart of operations performed by the memory controller for sorting stored VPI/VCI data according to majority decision.

DETAILED DESCRIPTION

Figure 4:
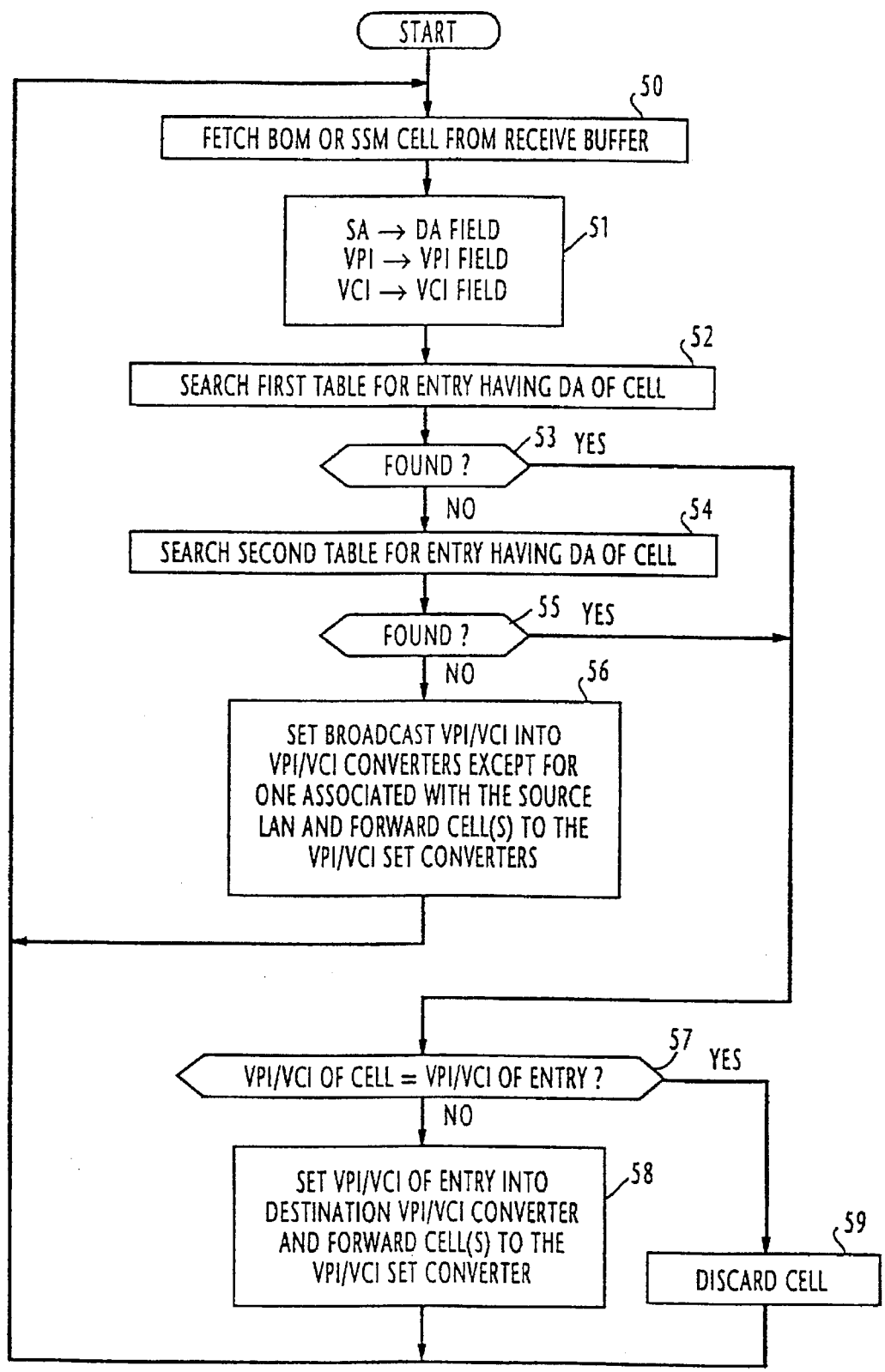
FIG. 4 is a flowchart of operations performed by a memory controller for making SA/VPI/VCI registration and for routing ATM cells.

As shown in FIG. 1, the LAN-ATM network of the present invention generally comprises an ATM (asynchronous transfer mode) switch 10, a plurality of CLSF (connectionless switching function) processors and a plurality of CLAD (cell assembly and disassembly) units. For simplicity, only two CLSF processors 11 and 16 are illustrated. Each CLSF processor serves one or more groups of local area networks via CLAD units. The CLSF processor 11, for example, is connected to LANs 15 via CLAD units 12, 13 and 14 using individual bus systems. The ATM switch 10 is a well known self-routing switch capable of routing ATM cells according to the VPI/VCI contained in their cell header.

Each CLAD unit has a simplified configuration as illustrated in FIG. 2. It consists of a buffer 20 for buffering ATM cells from the corresponding CLSF processor and a packet assembler 21 where the ATM cells from buffer 20 are disassembled into payload bits and assembled into a packet for transmission to the associated LAN's. Packets from the associated LAN's are stored in a buffer 22 and applied to a cell assembler 23. A VPI/VCI table 24 is provided for storing a VPI and a VCI (virtual path identifier and virtual channel identifier) for the CLSF processor to which the CLAD is directly connected. In the cell assembler 23, each packet is segmented into one or more 48-byte payloads and a 5-byte cell header is produced by using the VPI and VCI stored in the routing table 24 and attached to each payload to form a 53-byte ATM cell. Depending on the length of each packet, the output of cell assembler 23 comprises a BOM (beginning-of-message) cell, one or more COM (continuation-of-message) cells and an EOM (end-of-message) cell if the packet is of long length, or an SSM (single-segment-message) cell if the packet is of short length. The source and destination addresses (SA and DA) of the packet are contained in the payload of the BOM and SSM cells.

In FIG. 3, details of the CLSF processor 11, for example, are illustrated. CLSF processor 11 has a common bus 36 which is connected to the ATM switch 10 through a receive buffer 30 and through a transmit path including a VPI/VCI converter 31 and transmit buffer 32 connected thereto. On the LAN side of the CLSF processor, the bus 36 is connected to CLAD units 12, 13 and 14 via receive buffers 37, 40 and 43 and via transmit paths including VPI/VCI converters 38, 41, 44 and transmit buffers 39, 42 and 45 connected respectively thereto. Further connected to the bus 36 is a routing controller 33 for making SA/VPI/VCI registration and routing ATM cells. For registration of SA/VPI/VCI data, a first table 34 and a second table 35 are connected to the routing controller 33. Each of the first and second tables is partitioned into three columns; a DA (destination address) field, a VPI field and a VCI field. Each column is divided into a plurality of storage locations, or entries respectively having DA, VPI and VCI fields for storing the SA (source address), VIP and VCI of an ATM cell, respectively.

The operation of the routing controller 33 proceeds in accordance with the flowchart of FIG. 4. Controller 33 initiates its operation in response to receipt of a BOM or a SSM cell from a source LAN. In block 50, controller 33 fetches the received cell from buffers 30, 37, 40, 43. Flow proceeds to block 51 where the controller stores the SA, VPI and VCI data of the fetched cell into the DA, VPI and VCI fields, respectively, of one of vacant entries of the first table 34. If there is no vacant entry in the first table 34, the data in the oldest entry is discarded in a first-in-first-out fashion by shifting all the stored data by one entry to make a first entry vacant for storing the SA, VPI and VCI data of the most recently received cell.

In block 52, the controller 32 makes a search through the first table 34 in sequence, starting with the most recent entry followed by increasingly older ones, and a check is made, in block 53, for an entry having the same destination address as that of the cell. If there is no entry having the same DA data in the first table 34, flow proceeds from block 53 to block 54 where the controller makes a further search through the second table 35 and a check is made, in block 55, for an entry having the DA data of the fetched cell. If there is no entry having the same destination address in the second table 35, it is determined that no ATM cells have previously been directed to the source LAN, and controller 33 proceeds from block 55 to block 56 to set broadcast VPI and VCI into the VPI/VCI converters except for one that is associated with the source LAN and forwards the cell to all the other VPI/VCI converters. This ensures that a copy of each cell transmitted will be received by all the other LANs. During a learning phase, the procedure will be repeated and all CLSFs in the system rapidly build up the contents of their databases.

If the fetched cell is a BOM cell, subsequent COM and EOM cells of the same packet follow. In each of these VPI/VCI converters, the VPI/VCI data of each cell are rewritten with the broadcast VPI/VCI data and fed to the associated transmit buffer for transmission. After setting the VPI/VCI at block 56, flow returns to block 50 to repeat the process on a subsequently received cell.

If at least one packet has been previously sent from the destination LAN to the source LAN, there is an entry in one of the tables 34 and 35 having the same address data in its DA field as the destination address of the cell, and the decision at block 53 or 55 is affirmative, the next test, in block 57, determines whether the VPI/VCI data of the cell matches the VPI/VCI of the table entry. If they do not match, it is concluded that the cell is destined to another LAN and controller 33 proceeds from block 57 to block 58 to set the VPI/VCI data of the table entry into an appropriate VPI/VCI converter associated with the destination LAN and forward the cell to this converter. In this VPI/VCI converter, the VPI/VCI data of the cell is rewritten with the set value and the cell is fed into the associated transmit buffer for transmission. If the cell is a BOM cell, subsequent COM and EOM cells are forwarded to that VPI/VCI converter and fed to the associated transmit buffer.

If the VPI/VCI of the BOM or SSM cell matches the VPI/VCI of the table entry, it is concluded that the cell is destined to the same LAN from which the message was received and the controller 33 proceeds from block 57 to block 59 to discard the cell and all the subsequent cells if that cell is BOM, and returns to block 50. As the flowchart of FIG. 4 is executed for each incoming cell, the CLSF processor "learns" the source address and the associated VPI and VCI and routing is performed cell by cell.

At periodic intervals, the controller 33 provides a sorting operation according to the flowchart of FIG. 5 and selects one entry in the first table 34. The sorting routine begins with block 60 where the controller 33 initializes a variable "i" to 1 and proceeds to block 61 to detect those entries of the first table 34 having the same data in their DA fields as the DA field data of entry "i". In block 62, controller 33 checks to see if there is more than one detected entry. If so, the controller proceeds from block 62 to block 63 to check to see if different VPI/VCI data are contained in the detected entries. If so, flows proceeds from block 63 to block 64 where the controller divides the detected entries into groups according to the different sets of VPI and VCI and counts the number of entries of each group. In decision block 65, the controller determines whether there is more than one largest group. If there is only one largest group, the controller selects, in block 66, the only one largest group and select one entry from the selected group. If more than one largest group exists, flow proceeds from block 65 to block 67 where the controller selects one of the largest groups containing a greater number of recent entries and select most recent entry from the selected group. In block 68, controller 33 transfers the selected entry data from the first table 34 to the second table 35. In block 69, it is determined whether the variable "i" is smaller than N (i.e., the total number of entries of table 34). If so, flow proceeds from block 69 to block 70 to increment the variable "i" by 1 and flow returns to block 61 to repeat the process described above on entries of the first table having the same address as the DA filed of the incremented variable "i". This process continues until the variable "i" becomes equal to N.

It is seen that the address "learning" process and routing function are separated from prior-art CLAD units and incorporated into a single CLSF processor. Since each CLAD unit is simplified and the routing is performed cell-by-cell, connectionless communication with a low latency is realized between LANs.

The foregoing description shows only one preferred embodiment of the present invention. Various modifications are apparent to those skilled in the art without departing from the scope of the present invention which is only limited by the appended claims.

What is claimed is:

1. An apparatus for an asynchronous transfer mode (ATM)—local area network (LAN) communication system having an ATM switch and a plurality of LANs, comprising:

a plurality of cell assembly disassembly (CLAD) units, each of the CLAD units segmenting a packet received from a LAN into payloads and assembling the payloads into ATM cells each containing a VPI and a VCI and disassembling received ATM cells into payloads and assembling the payloads into a packet for transmission to the LAN; and a connectionless switching function (CLSF) processor for receiving ATM cells either from the ATM switch or from the CLAD units, the CLSF processor having a database for storing address information of the received ATM cells, and routing the received ATM cells to the ATM switch and the CLAD units according to the address information of the database;

said database including a plurality of entries each having a destination address (DA) field, a VPI field and a VCI field, said CLSF processor being responsive to receipt of an ATM cell for respectively storing a source address, a VPI and a VCI contained in the received cell into the DA, VPI and VCI fields of one of the entries of the database, making a search through said database for an entry having a DA field containing the source address of said received cell, a VPI field and a VCI field whose contents are different from the VPI and VCI of said received cell, rewriting the VPI and VCI of said received cell with said different VPI and VCI to produce a transmit cell if said entry is detected by the search, and forwarding the transmit cell to a destination.

2. An apparatus as claimed in claim 1, wherein said CLSF processor is responsive to the received ATM cell for making a search through said database for an entry having a DA field containing the source address of said received cell, rewriting the VPI and VCI of said received cell with broadcast VPI and VCI to produce a broadcast cell if the search fails to detect said entry, and forwarding the broadcast cell to a plurality of destinations.

3. An apparatus as claimed in claim 1, wherein said CLSF processor including:

a plurality of receive buffers for receiving ATM cells from said ATM switch and said CLAD units;

a plurality of VPI/VCI converters for rewriting the VPI and VCI of the received ATM cells with a set of VPI and VCI stored in said database;

a plurality of transmit buffers connected respectively to the VPI/VCI converters for forwarding ATM cells from the VPI/VCI converters to said ATM switch and said CLAD units.

4. An apparatus for an asynchronous transfer mode (ATM)—local area network (LAN) communication system having an ATM switch and a plurality of LANs, comprising:

a plurality of cell assembly disassembly (CLAD) units, each of the CLAD units segmenting a packet received from a LAN into payloads and assembling the payloads into ATM cells each containing a VPI and a VCI and disassembling received ATM cells into payloads and assembling the payloads into a packet for transmission to the LAN; and a connectionless switching function (CLSF) processor for receiving ATM cells either from the ATM switch or from the CLAD units, the CLSF processor having a database for storing address information of the received ATM cells, and routing the received ATM cells to the ATM switch and the CLAD units according to the address information of the database;

said database including:

a first table including a plurality of entries, each of the entries having a destination address (DA) field, a VPI field and a VCI field, and a second table including a plurality of entries, each of the entries having a destination address (DA) field, a VPI field and a VCI field, said CLSF processor being responsive to receipt of an ATM cell for respectively storing a source address, a VPI and a VCI contained in the received cell into the DA, VPI and VCI fields of one of the entries of the first table, making a search through said first and tables for an entry having a DA field containing the source address of said received cell and a VPI field and a VCI field containing a VPI and a VCI different from the VPI and VCI of said received cell, rewriting the VPI and VCI of said received cell with said different VPI and VCI to produce a transmit cell if said entry is detected by the search, and forwarding the transmit cell to a destination, the CLSF processor sorting the entries of the first table at intervals and storing the sorted entries into said second table.

5. An apparatus as claimed in claim 4, wherein said CLSF processor is responsive to the received ATM cell for making a search through said first and second tables for an entry having a DA field containing the source address of said received cell, rewriting the VPI and VCI of said received cell with broadcast VPI and VCI to produce a broadcast cell if the search fails to detect said entry, and forwarding the broadcast cell to a plurality of destinations.

6. An apparatus as claimed in claim 4, wherein said CLSF processor including:

a plurality of receive buffers for receiving AIM cells from said ATM switch and said CLAD units;

a plurality of VPI/VCI converters for rewriting the VPI and VCI of the received ATM cells with a set of VPI and VCI stored in said first and second tables;

a plurality of transmit buffers connected respectively to the VPI/VCI converters for forwarding ATM cells from the VPI/VCI converters to said ATM switch and said CLAD units.

7. A communication system comprising:

an asynchronous transfer mode (ATM) switch for routing received ATM cells according to a virtual path identifier (VPI) and a virtual channel identifier (VCI) contained in each of the cells;

a plurality of groups of cell assembly disassembly (CLAD) unit, each of the CLAD units segmenting a received packet into payloads and assembling the payloads into ATM cells each containing a VPI and a VCI and disassembling received ATM cells into payloads and assembling the payloads into a packet;

a plurality of local area networks (LANs) connected respectively to the CLAD units for transmitting and receiving a packet to and from the respective CLAD units; and a plurality of connectionless switching function (CLSF) processors, each of the CLSF processors receiving ATM cells either from the ATM switch or from the CLAD units, each CLSF processor having a database for storing address information of the received ATM cells, and routing the received ATM cells to the ATM switch and the CLAD units according to the address information of the database;

said database including a plurality of entries each having a destination address (DA) field, a VPI field and a VCI field, each of said CLSF processors being responsive to receipt of an ATM cell for respectively storing a source address, a VPI and a VCI contained in the received cell into the DA, VPI and VCI fields of one of the entries of the database, making a search through said database for an entry having a DA field containing the source address of said received cell, a VPI field and a VCI field whose contents are different from the VPI and VCI of said received cell, rewriting the VPI and VCI of said received cell with said different VPI and VCI to produce a transmit cell if said entry is detected by the search, and forwarding the transmit cell to a destination.

8. A communication system as claimed in claim 7, wherein each of said CLSF processors is responsive to the received ATM cell for making a search through said database for an entry having a DA field containing the source address of said received cell, rewriting the VPI and VCI of said received cell with broadcast VPI and VCI to produce a broadcast cell if the search fails to detect said entry, and forwarding the broadcast cell to a plurality of destination.

9. A communication system as claimed in claim 7, wherein each of said CLSF processors including:

a plurality of receive buffers for receiving ATM cells from said ATM switch and said corresponding CLAD units;

a plurality of VPI/VCI converters for rewriting the VPI and VCI of the received ATM cell with a set of VPI and VCI stored in said database;

a plurality of transmit buffers connected respectively to the VPI/VCI converters for forwarding ATM cells from the VPI/VCI converters to said ATM switch and said corresponding CLAD units.

10. A communication system comprising:

an asynchronous transfer mode (ATM) switch for routing received ATM cells according to a virtual path identifier (VPI) and a virtual channel identifier (VCI) contained in each of the cells;

a plurality of groups of cell assembly disassembly (CLAD) unit, each of the CLAD units segmenting a received packet into payloads and assembling the payloads into ATM cells each containing a VPI and a VCI and disassembling received ATM cells into payloads and assembling the payloads into a packet;

a plurality of local area networks (LANs) connected respectively to the CLAD units for transmitting and receiving a packet to and from the respective CLAD units; and a plurality of connectionless switching function (CLSF) processors, each of the CLSF processors receiving ATM cells either from the ATM switch or from the CLAD units, each CLSF processor having a database for storing address information of the received ATM cells, and routing the received ATM cells to the ATM switch and the CLAD units according to the address information of the database;

said database including:

a first table including a plurality of entries, each of the entries having a destination address (DA) field, a VPI field and a VCI field; and a second table including a plurality of entries, each of the entries having a destination address (DA) field, a VPI field and a VCI field, each of said CLSF processors being responsive to receipt of an ATM cell for respectively storing a source address, a VPI and a VCI contained in the received cell into the DA, VPI and VCI fields of one of the entries of the first table, making a search through said first and tables for an entry having a DA field containing the source address of said received cell and a VPI field and a VCI field containing a VPI and a VCI different from the VPI and VCI of said received cell, rewriting the VPI and VCI of said received cell with said different VPI and VCI to produce a transmit cell if said entry is detected by the search, and forwarding the transmit cell to a destination, the CLSF processor sorting the entries of the first table at intervals and storing the sorted entries into said second table.

11. A communication system as claimed in claim 10, wherein each of said CLSF processors is responsive to the received ATM cell for making a search through said first and second tables for an entry having a DA field containing the source address of said received cell, rewriting the VPI and VCI of said received cell with broadcast VPI and VCI to produce a broadcast cell if the search fails to detect said entry, and forwarding the broadcast cell to a plurality of destinations.

12. A communication system as claimed in claim 10, wherein each of said CLSF processors including:

a plurality of receive buffers for receiving ATM cells from said ATM switch and said corresponding CLAD buffers;

a plurality of VPI/VCI converters for rewriting the VPI and VCI of the received ATM cells with a set of VPI and VCI stored in said first and second tables;

a plurality of transmit buffers connected respectively to the VPI/VCI converters for forwarding ATM cells from the VPI/VCI converters to said ATM switch and said corresponding CLAD units.

* * * * *